Patented Mar. 11, 1930

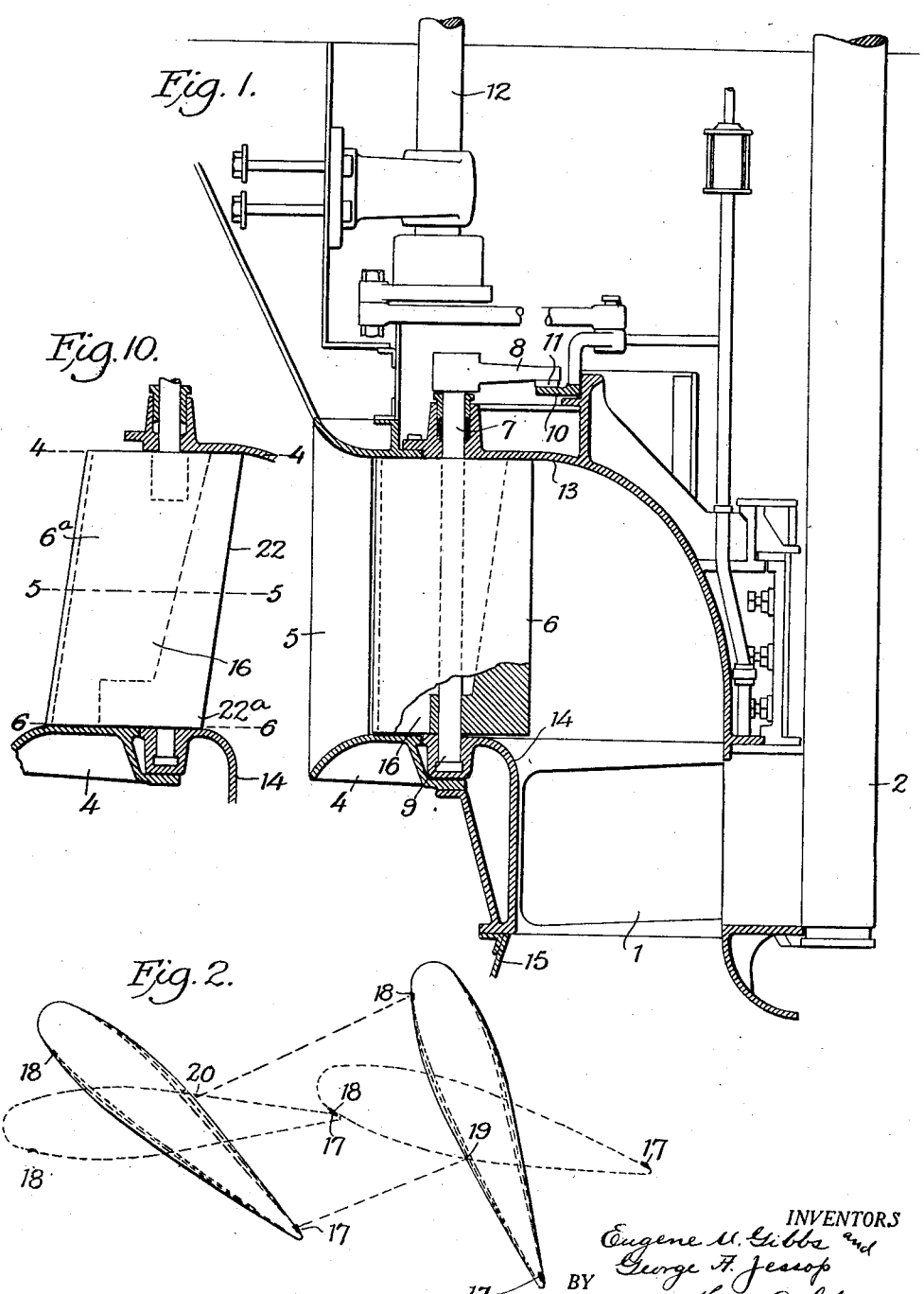

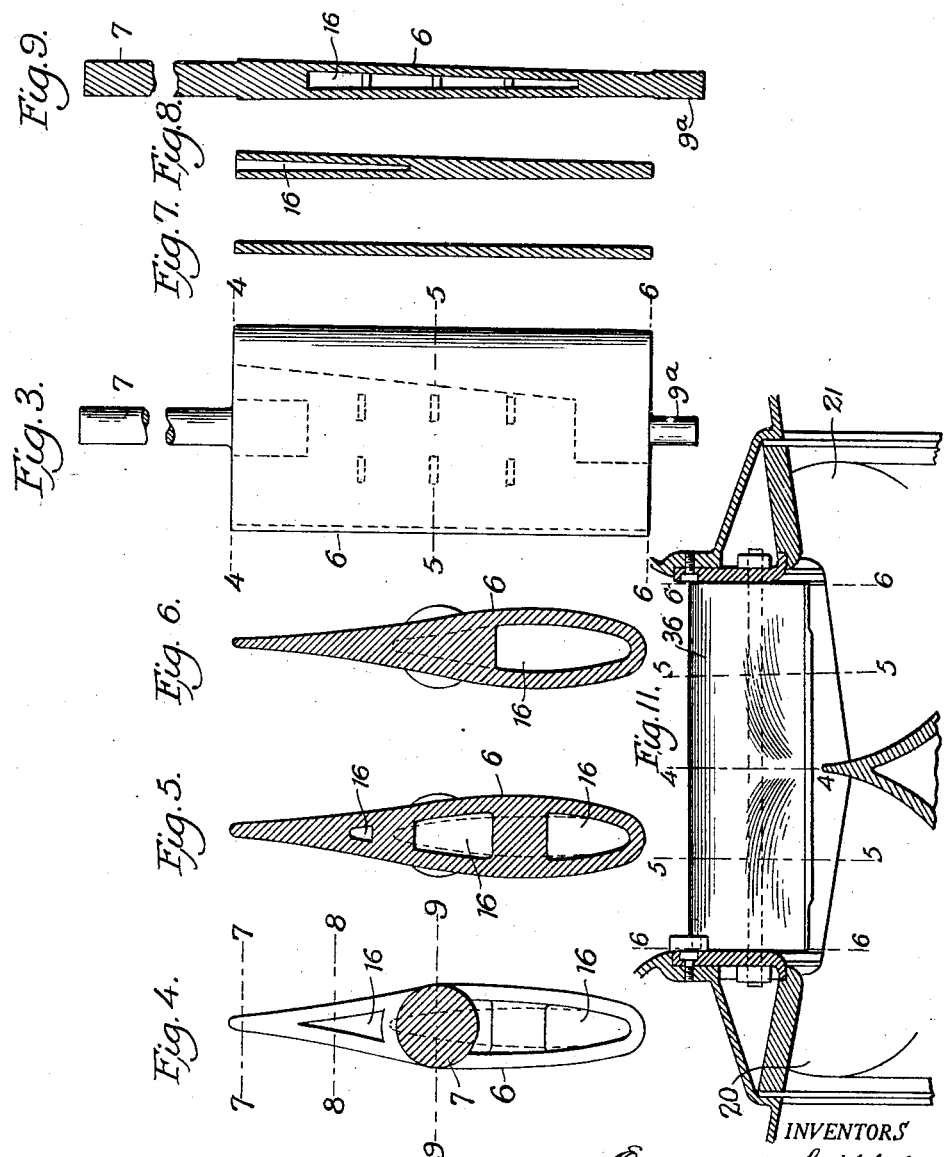

1,750,400

UNITED STATES PATENT OFFICE

EUGENE U. GIBBS AND GEORGE A. JESSOP, OF YORK, PENNSYLVANIA

WICKET GATE FOR HYDRAULIC TURBINES

Application filed April 7, 1928. Serial No. 268,229.

The present invention relates to improvements in wicket gates for water turbines whose cross section is of the general stream-line type.

The invention consists in maintaining this general stream-line form while increasing the effective cross section of the stream between a pair of such gates, increasing the flow past the gates and at the same time increasing the quantity of water through the gates particularly towards the bottom thereof, adjacent the outer ends of the runner blades.

The effect of the structure of our blades is to increase the capacity and velocity of the runner, which in high specific speed turbines is a very material advantage, and decrease pitting of the runner by obtaining a solid stream before it acts on the runner.

The increase of cross section between the gates is preferably from the top of the gate downward inside the water joint so that the quantity of water delivered through the gates will be smoother and along more efficient lines of flow.

For a given size of turbine the runner can be placed nearer the top surface of the lower gate-pintle plate or ring of the turbine thus decreasing the over all height of the runner enclosing ring, the length of shaft and the depth of the top gate-pintle plate. By making the gates as thin as possible at the lower end consistent with mechanical strength, a maximum width of passage between them is obtained allowing the over all height of the gates and therefore the over all height of the turbine unit to be a minimum for a given capacity. There is less metal in the gates.

The invention is efficient with the usual types of turbines employing inlet wicket gates to regulate the flow of water around the runner.

To this end we make the gates tapered from the top to bottom preferably inside the planes of the water joints.

The annexed drawings are illustrative of our gate construction and like parts are similarly designated.

Figure 1 is a cross section of a turbine showing the general arrangement of the gates with one form of turbine of well known construction;

Fig. 2 is a plan view of two adjacent gates;
Fig. 3 is a side view of a gate;
Fig. 4 is a plan view on line 4—4, Fig. 3;
Fig. 5 is a section on line 5—5 of Fig. 3;
Fig. 6 is a section on line 6—6, Fig. 3;
Figs. 7, 8 and 9, are sections on lines 7—7, 8—8 and 9—9 respectively of Fig. 4;
Fig. 10 is the side view of a gate constructed in accordance with our invention but whose lower end does not overhang the lower gate-pintle ring;
Fig. 11 is a view illustrating a gate for a double flow turbine;

Figure 1 shows a turbine construction using a well known type of wheel or runner, the axial flow type.

The runner is indicated at 1 and is keyed to a shaft 2 from which the power is taken usually by a directly connected electric generator, not shown. The whole turbine is mounted in a concrete casing or base or other well known form of setting. The water flows from the casing to the speed ring 4 having guide vanes 5, usually stationary. Inside the guide vanes 5 are the movable wicket gates 6. These gates have upper pintles 7 usually cast integrally with them, to which are keyed levers 8 that connect the gates to a shifting ring 10 by means of links 11.

The gate ring is operated either manually or from a governor shaft 12 to rotate the gates a partial revolution to open and close them.

The gates have lower pintles 9, also usually cast integrally with them that act as supporting trunnions or stems. The gates are mounted between the top plate 13 and a bottom gate-pintle plate 14. These plates also act as upper and lower guides for the water. The bottom plate 14 also acts as an enclosing ring for the runner 1.

These wicket gates serve to regulate the quantity of water supplied to the turbine and thereby regulate the power to suit the demand required by the operating conditions.

The water leaves the runner and is discharged through a draft tube 15 into a tail pit and thence to the tail race. The foregoing short description is deemed sufficient to describe the application and use of wicket gates which is a customary one.

Our invention is more nearly concerned with the structure and shape of these gates and their relation to the pintle rings, 13, 14, and more especially with relation to the bottom ring 14 or runner inclosing tube.

We make the gates thicker at the entrance end of the gate and taper along stream-lines to a straight inner edge of uniform thickness, which, when a gate is closed, lies against the thicker end of an adjacent gate.

The gate according to our construction is usually cast and cored to form a hollow 16 therein open from top to bottom, but may be made with sheet metal guiding or flow surfaces with the stems and ribs welded thereto as shown in the co-pending application of G. J. Jessop, Ser. No. 137,796, filed September 25, 1926, patented September 11, 1928, No. 1,683,791.

As shown each gate has two contacting surfaces one 17, Fig. 2 at the thin edge adjacent the runner on one face and the other 18 at the thicker end that form the water joints. These surfaces are preferably machined.

According to our invention the upper end of a gate is generally of larger cross section as shown in Fig. 4, taken on line 4—4, Fig. 3 and the area of cross section diminishes downwardly toward the runner enclosing ring 14, as shown in Fig. 5 with a section on line 5—5 of Fig. 3 and a section as in Fig. 6, taken on line 6—6 Fig. 3. The thin inner edge as indicated in Fig. 7 which is a section on line 7—7, Fig. 4 at the water joint, shall be of uniform thickness and the taper from top to bottom is shown in the vertical section Fig. 8, being taken on line 8—8 of Fig. 4. Fig. 9 is a vertical section of Fig. 4 through the pintles. By a comparison of these figures it will be noted that thickness of the blade decreases from top to bottom and from the thicker to the thinner edge proximate the runner.

It will be noted that the side surfaces of the blades, as indicated by the outlines of Figs. 2, 4, 5, 6, are stream line surfaces. Inasmuch as the form of the body of water passing between two adjacent gates shall increase in width downwardly by reason of the thickness of blade decreasing downwardly and that in so far as the nozzle effect of the side surfaces of two adjacent gates is concerned, it lies mainly between the water joints, we prefer to make the taper of the blades mainly between the water joint surfaces 17 and 18.

Thus in Fig. 2 the main portion of the nozzle lies between water joint surface 17 on the left hand gate, Fig. 2 and a point about opposite thereto, say about at 19, which is the lesser distance between the gates and a line drawn from the water joint surface 18 of the right hand gate to a point about at 20 in the left hand gate, being the entrance end of the main portion of the nozzle formed between two adjacent gates. It is between these two lines that the modified shape of the jet passing between the two gates is of major importance. The volume of water passing between two such tapered gates is greatly increased especially that portion that passes over the lower pintle ring 14 and immediately above the runner.

By reason of this taper of the gates and the greater volume of water admitted at the gates, which volume is greater nearer the periphery of the runner, the so-called pitting is either very much reduced or entirely eliminated. The lower pintle 9ª can be of reduced diameter compared to the upper pintle, 7, because the former acts as a supporting trunnion only, whereas the latter acts both as a supporting member and as the torsion member to operate the gate and hold it in proper relative angular position.

Now in Figs. 1 to 10, it will be noted that the gates are vertical and their effective length with relation to the runner is from top to bottom, but with a divided flow turbine the gate is constructed as shown in Fig. 11.

In this figure the gate 36, so to say, is composed of two gates with their thicker ends joined at the middle on line 4—4 of which Fig. 4 is a section, the gate tapers therefrom to both ends as indicated by lines 5—5 and 6—6 of which Figs. 5 and 6 are respectively the sections.

The effective length of this gate with relation to a runner is but half the axial length of the gate i. e. from the section on line 4—4 to the section on line 6—6 each length supplying a set of blades 20, and 21 of a runner.

It is the practice with some turbines to allow the gates 6 to overhang the lower pintle ring 14 as shown in Fig. 1. Our structure of gate will increase the efficiency of a turbine using this type of wicket gates. However, the efficiency is still further increased when the lower portion of the gate does not overhang the lower pintle ring, as shown in Fig. 10, and especially when using the tapered gate of our invention.

In this construction the gate 6ª has the thin straight inner edge 22, of uniform thickness, inclined so that the lower inner corner 22ª does not overhang ring 14, although the upper inner corner does overhang ring 14 as clearly shown in Fig. 10. It will be noted by reference to Figs. 4, 5, 6 and 11 that the taper of the blade from top to bottom is mainly between the pintles 7 and the plane through the water joint surface at the narrower delivery edge, that is, about between the section line 9—9, Fig. 4, and the section line 7—7, Fig. 4.

While we have shown our invention as used in connection with an axial flow turbine, it can be used equally with a Francis turbine or any other type using wicket gates.

We claim—

1. A wicket gate for turbines decreasing in thickness downwardly over a substantial part of the gate and increasing the volume of water passing between the gates.

2. A wicket gate for turbines decreasing in thickness downwardly over a substantial part of the gate and having stream line side surfaces whereby the volume of water passing between the gates is increased.

3. A wicket gate for water turbines decreasing in thickness over a substantial part of the gate toward its end nearest the runner periphery to increase the volume of water passing between the gates.

4. A wicket gate for turbines decreasing in thickness downwardly between the planes of the water joint surfaces of the gate.

5. A wicket gate for turbines decreasing in thickness downwardly between the planes of the water joint surfaces of the gate and having lateral stream line side faces.

6. A gate pintle water turbine ring in combination with wicket gates having bearing in said ring, said gates decreasing in thickness from top to bottom and having their inner ends overhanging said ring when in open position.

7. A gate pintle turbine ring in combination with wicket gates having bearing in said ring, said gates decreasing in thickness from top to bottom and having the upper portions of their inner ends overhanging said ring.

8. A gate pintle turbine ring in combination with wicket gates having bearing in said ring, said gates decreasing in thickness downwardly between the water joint surfaces and overhanging said ring.

9. A gate pintle turbine ring adjacent a turbine runner in combination with wicket gates bearing in said ring, said gates decreasing in thickness toward said ring, and the top inner portion of the gates overhanging said ring.

10. A gate pintle turbine ring in combination with wicket gates bearing in said ring each decreasing in thickness from top to bottom between its water joint surfaces and having lateral stream line surfaces and its narrower inner edge overhanging said ring and the extent of overhang decreasing downwardly.

11. A wicket gate having stream line side surfaces, said gate decreasing in thickness from top to bottom between the water joint surfaces and pintles integral with the gate of different diameters.

12. A wicket gate having stream line side surfaces, said gate decreasing in thickness from top to bottom between the water joint surfaces thereof; an upper pintle on the gate and a lower pintle on the gate of less diameter than the upper pintle.

13. Wicket gate for water turbines having pivot pintles, said gate tapering from top to bottom mainly between the pintles and the plane of the water joint surface at the narrower edge.

14. In a turbine, a shroud ring in combination with a pivoted wicket gate decreasing in thickness along its effective length toward said ring between the planes of the water joint surfaces of the gate and whose inner edge is of uniform thickness.

15. In a turbine, a runner having a plurality of blades, pintle rings and a gate pivoted in said rings, said gate decreasing in thickness along its effective length toward ends of the runner blades between the planes of the water joint surfaces of the gate and whose edge is of uniform thickness, the side surfaces of said gate being stream line surfaces.

In testimony that we claim the foregoing as our invention, we have signed our names.

EUGENE U. GIBBS.
GEORGE A. JESSOP.